(12) United States Patent  
Cho et al.

(10) Patent No.: US 11,398,655 B2  
(45) Date of Patent: Jul. 26, 2022

(54) BATTERY PACK HAVING FUNCTION OF PREVENTING INFLOW OF LEAKING COOLANT

(71) Applicant: LG CHEM, LTD., Seoul (KR)

(72) Inventors: Yong Jin Cho, Daejeon (KR); Jun Yeob Seong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 206 days.

(21) Appl. No.: 16/593,611

(22) Filed: Oct. 4, 2019

(65) Prior Publication Data

US 2020/0036066 A1    Jan. 30, 2020

Related U.S. Application Data

(63) Continuation of application No. PCT/KR2018/008273, filed on Jul. 23, 2018.

(30) Foreign Application Priority Data

Oct. 17, 2017    (KR) .......................... 10-2017-0134315

(51) Int. Cl.
    *H01M 10/6567*    (2014.01)
    *H01M 10/6554*    (2014.01)
    (Continued)

(52) U.S. Cl.
    CPC .......... *H01M 10/6567* (2015.04); *F28F 3/12* (2013.01); *H01M 10/613* (2015.04);
    (Continued)

(58) Field of Classification Search
    None
    See application file for complete search history.

(56) References Cited

U.S. PATENT DOCUMENTS 7,951,477 B2    5/2011    Wood et al.
8,530,069 B2    9/2013    Wood et al.
(Continued)

FOREIGN PATENT DOCUMENTS

CN    101627490 A    1/2010
CN    102171884 A    8/2011
(Continued)

OTHER PUBLICATIONS

The Purpose of O-Rings. Feb. 27, 2017. Bryan Hose and Gasket. (Year: 2017).*

(Continued)

*Primary Examiner* — Ula C Ruddock  
*Assistant Examiner* — Mary Grace Byram  
(74) *Attorney, Agent, or Firm* — Birch, Stewart, Kolasch & Birch, LLP

(57) ABSTRACT

A battery pack prevents an inflow of a leaking coolant. The battery pack includes a housing, in which at least one battery cell or battery module is mounted, a heat exchanger provided in the housing for cooling the battery cell or the battery module, and seal provided between the heat exchanger and the inner surface of the housing for preventing coolant leaking from the heat exchanger from flowing into a space in which the battery cell or the battery module is placed, whereby the stability and reliability of the battery pack are improved.

14 Claims, 10 Drawing Sheets

(51) Int. Cl.

| | |
|---|---|
| *H01M 10/613* | (2014.01) |
| *H01M 10/625* | (2014.01) |
| *H01M 50/24* | (2021.01) |
| *H01M 50/691* | (2021.01) |
| *H01M 50/20* | (2021.01) |
| *F28F 3/12* | (2006.01) |
| *H01M 50/60* | (2021.01) |
| *H01M 10/6556* | (2014.01) |
| *F28D 21/00* | (2006.01) |
| *F28F 1/00* | (2006.01) |

(52) U.S. Cl.
CPC ..... *H01M 10/625* (2015.04); *H01M 10/6554* (2015.04); *H01M 10/6556* (2015.04); *H01M 50/20* (2021.01); *H01M 50/24* (2021.01); *H01M 50/60* (2021.01); *H01M 50/668* (2021.01); *H01M 50/691* (2021.01); *F28D 2021/0028* (2013.01); *F28D 2021/0043* (2013.01); *F28F 1/003* (2013.01); *F28F 2265/16* (2013.01); *H01M 2220/20* (2013.01)

(56) References Cited

U.S. PATENT DOCUMENTS

| | | | |
|---|---|---|---|
| 8,911,896 | B2 | 12/2014 | Jin |
| 9,196,879 | B2 | 11/2015 | Hayashi et al. |
| 9,350,000 | B2 | 5/2016 | Hayashi et al. |
| 9,786,878 | B2 | 10/2017 | Hayashi et al. |
| 9,847,536 | B2 | 12/2017 | Freese, V |
| 9,899,645 | B2 | 2/2018 | Hayashi et al. |
| 10,056,658 | B2 | 8/2018 | Park et al. |
| 2005/0191543 | A1* | 9/2005 | Harrington ......... H01M 50/543 429/178 |
| 2009/0023061 | A1* | 1/2009 | Ogg .................. H01M 10/0413 429/162 |
| 2009/0274952 | A1 | 11/2009 | Wood et al. |
| 2011/0212352 | A1 | 9/2011 | Wood et al. |
| 2012/0009457 | A1 | 1/2012 | Lee et al. |
| 2012/0171532 | A1 | 7/2012 | Lee et al. |
| 2012/0315529 | A1 | 12/2012 | Jin |
| 2013/0004822 | A1 | 1/2013 | Hashimoto et al. |
| 2013/0224539 | A1 | 8/2013 | Hayashi et al. |
| 2013/0295422 | A1 | 11/2013 | Kim et al. |
| 2014/0202671 | A1 | 7/2014 | Yan |
| 2014/0332085 | A1* | 11/2014 | Grace ............... H01M 10/0525 137/2 |
| 2014/0356665 | A1 | 12/2014 | Hayashi et al. |
| 2015/0171493 | A1 | 6/2015 | Freese et al. |
| 2016/0036103 | A1 | 2/2016 | Yamamoto et al. |
| 2016/0087319 | A1 | 3/2016 | Roh et al. |
| 2016/0093870 | A1 | 3/2016 | DeKeuster et al. |
| 2016/0222631 | A1* | 8/2016 | Koh ........................ B60L 1/003 |
| 2016/0233463 | A1 | 8/2016 | Hayashi et al. |
| 2016/0268657 | A1 | 9/2016 | Park et al. |
| 2016/0301088 | A1 | 10/2016 | Freese, V |
| 2017/0033419 | A1 | 2/2017 | Eom et al. |
| 2017/0047623 | A1 | 2/2017 | Kim et al. |
| 2017/0125858 | A1 | 5/2017 | Miller et al. |
| 2018/0026241 | A1 | 1/2018 | Hayashi et al. |
| 2018/0151927 | A1 | 5/2018 | An et al. |
| 2018/0248237 | A1 | 8/2018 | Postler et al. |

FOREIGN PATENT DOCUMENTS

| | | |
|---|---|---|
| CN | 102714337 A | 10/2012 |
| CN | 102856516 A | 1/2013 |
| CN | 103201875 A | 7/2013 |
| CN | 103314478 A | 9/2013 |
| CN | 103748736 A | 4/2014 |
| CN | 204271163 U | 4/2015 |
| CN | 104833250 A | 8/2015 |
| CN | 104981937 A | 10/2015 |
| CN | 105186062 A | 12/2015 |
| CN | 105390636 A | 3/2016 |
| CN | 105493339 A | 4/2016 |
| CN | 105977582 A | 9/2016 |
| CN | 106058282 A | 10/2016 |
| CN | 106450073 A | 2/2017 |
| CN | 106469839 A | 3/2017 |
| CN | 106856230 A | 6/2017 |
| DE | 10 2008 059 969 A1 | 6/2010 |
| DE | 102013016620 A1 | 4/2015 |
| DE | 10 2015 216 029 A1 | 2/2017 |
| EP | 2 595 216 A1 | 5/2013 |
| EP | 2955780 A1 | 12/2015 |
| EP | 3 214 669 A1 | 9/2017 |
| FR | 3015127 A1 | 6/2015 |
| JP | 59-152564 U | 10/1984 |
| JP | 2011-173447 A | 9/2011 |
| JP | 2012-136267 A | 7/2012 |
| JP | 2013-109976 A | 6/2013 |
| JP | 2014-93245 A | 5/2014 |
| JP | 2014-203564 A | 10/2014 |
| JP | 2014-229421 A | 12/2014 |
| JP | 2015-141887 A | 8/2015 |
| JP | 2015-525442 A | 9/2015 |
| JP | 2018-511509 A | 4/2016 |
| JP | 2016-201357 A | 12/2016 |
| JP | 2017-37772 A | 2/2017 |
| KR | 10-2012-0137792 A | 12/2012 |
| KR | 10-2014-0074151 A | 6/2014 |
| KR | 10-2016-0109679 A | 9/2016 |
| KR | 10-2017-0021122 A | 2/2017 |
| KR | 10-2017-0059178 A | 5/2017 |
| WO | WO 2012/143120 A1 | 10/2012 |
| WO | WO 2017/002325 A1 | 1/2017 |
| WO | WO-2017002325 A1 * | 1/2017 ........ H01M 10/613 |

OTHER PUBLICATIONS

Machine English translation of WO-2017002325-A1 originally published to Omura Jan. 2017 (Year: 2017).*
Extended European Search Report for European Application No. 16868318.9, dated Sep. 15, 2020.
Partial European Search Report dated Jun. 25, 2020, for European Application No. 18868318.9.
International Search Report (PCT/ISA/210) issued in PCT/KR2018/008273, dated Nov. 6, 2018.

* cited by examiner

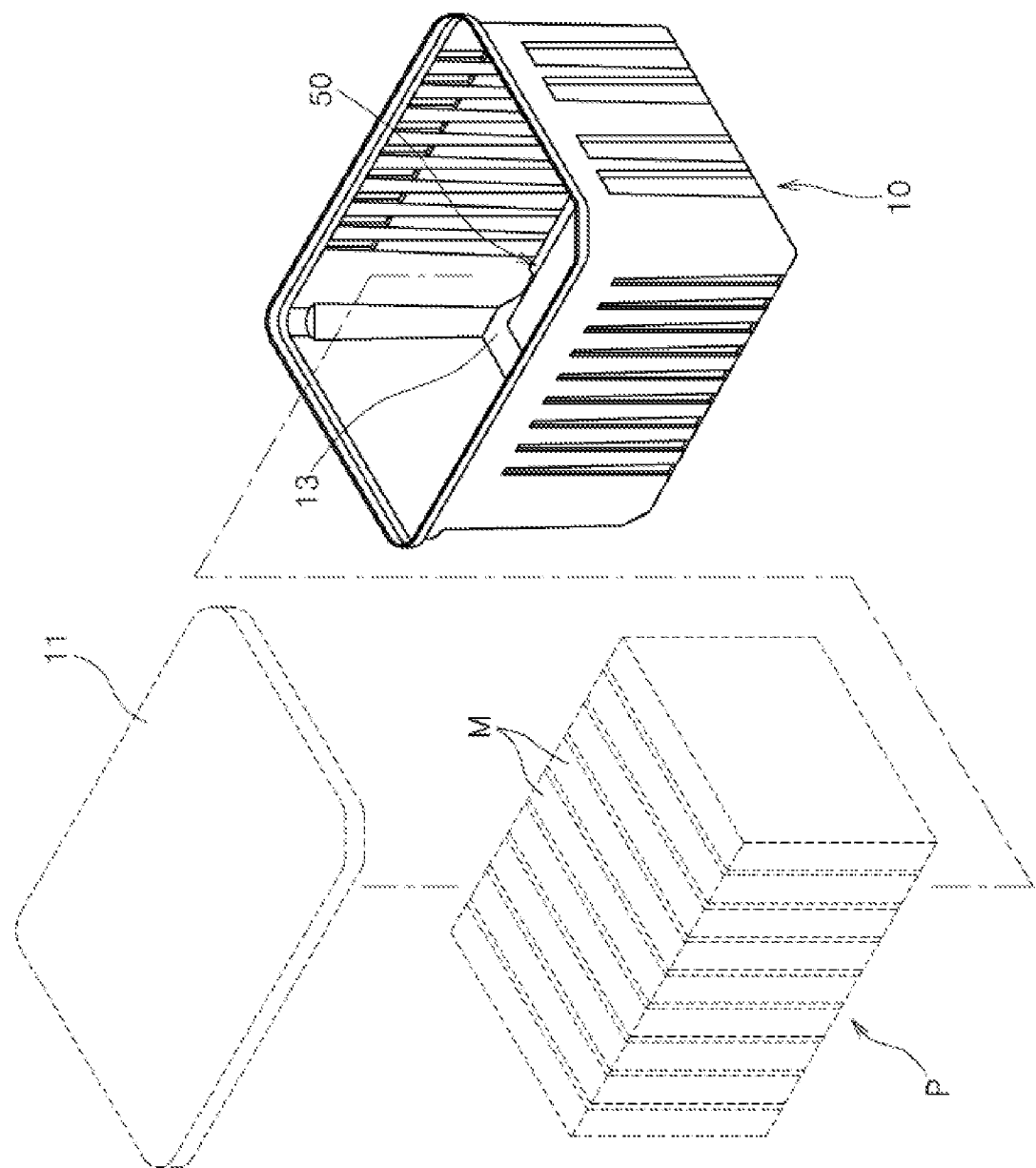

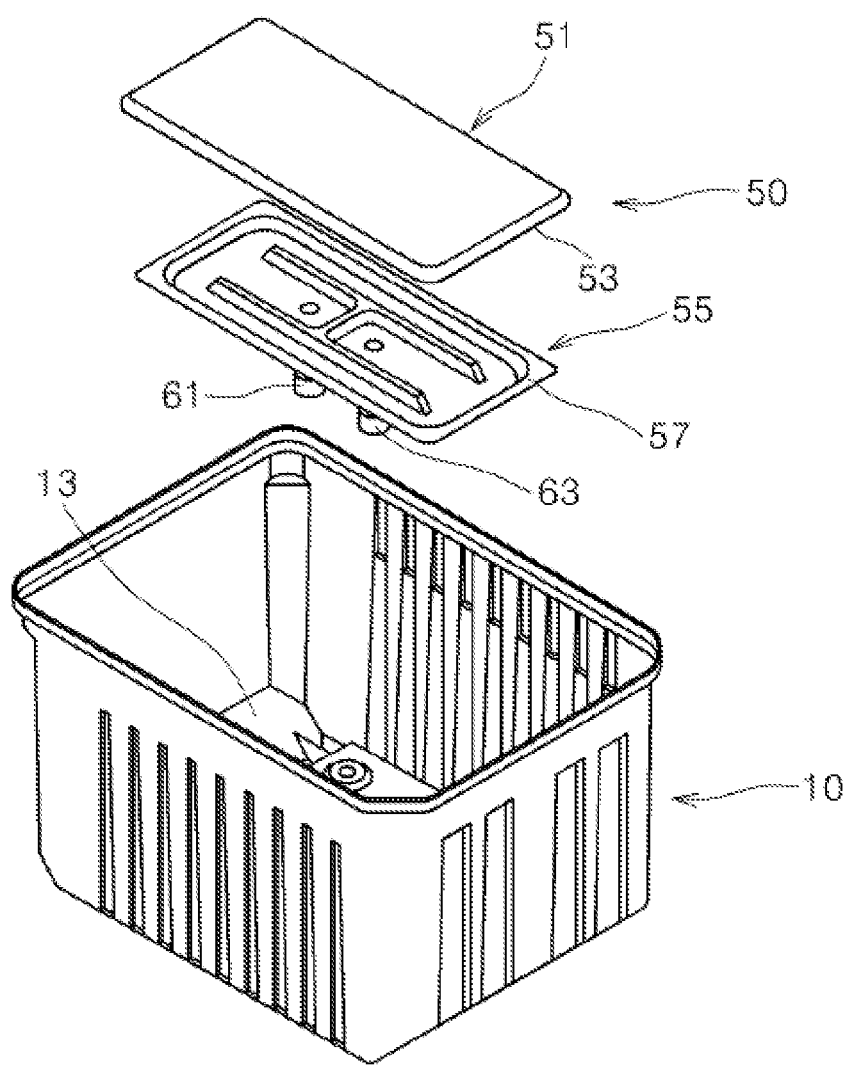
[FIG. 2]

[FIG. 3]
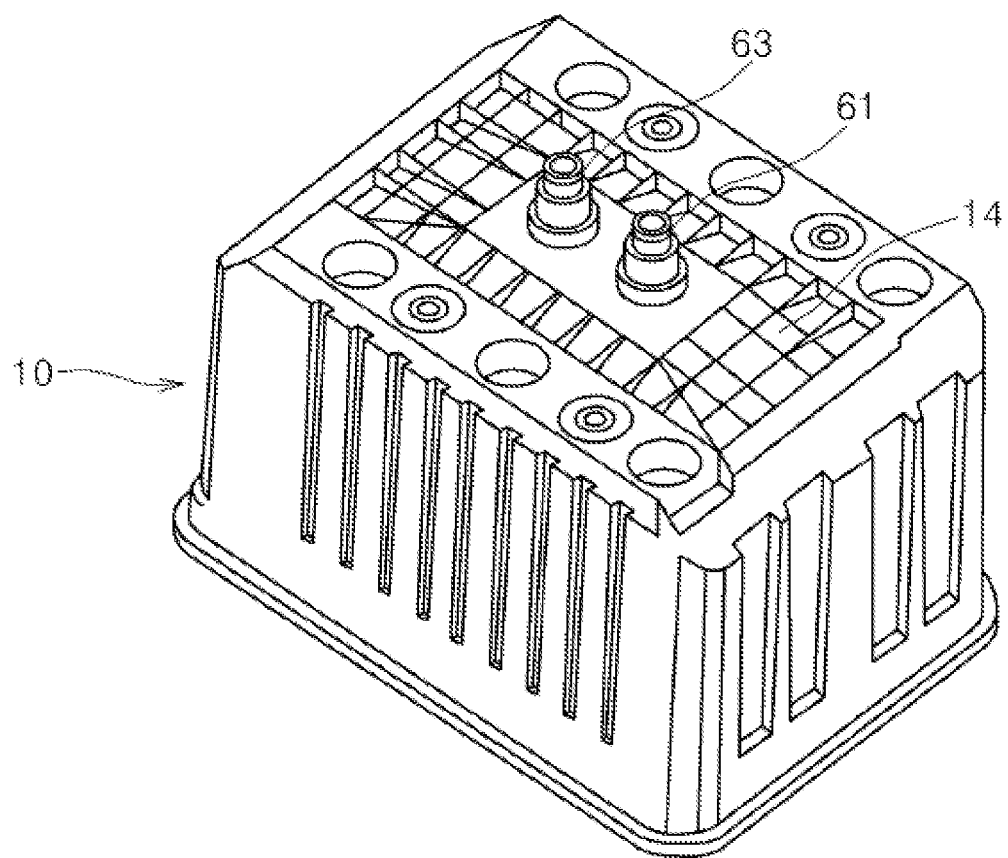

【FIG. 4】
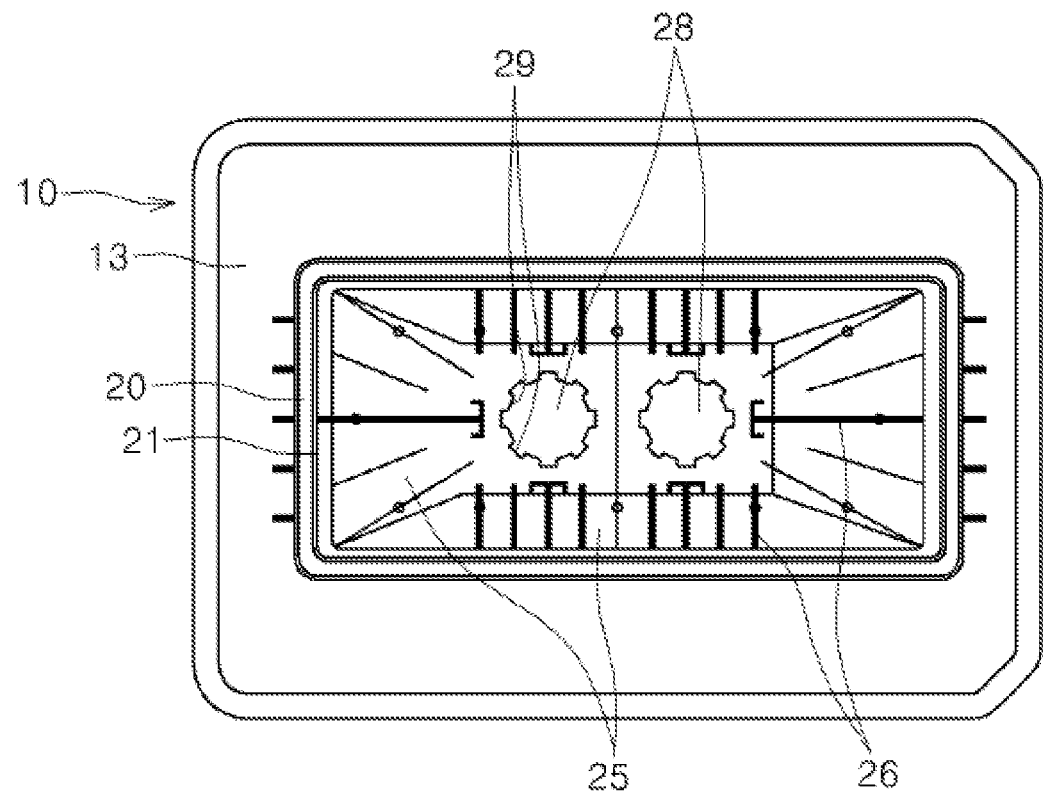
【FIG. 5】
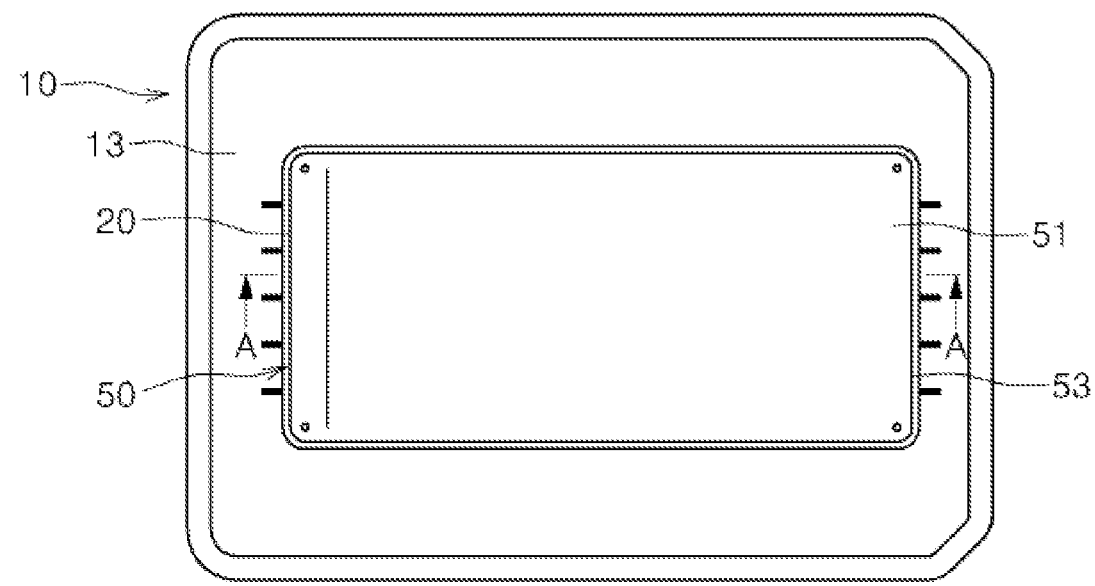

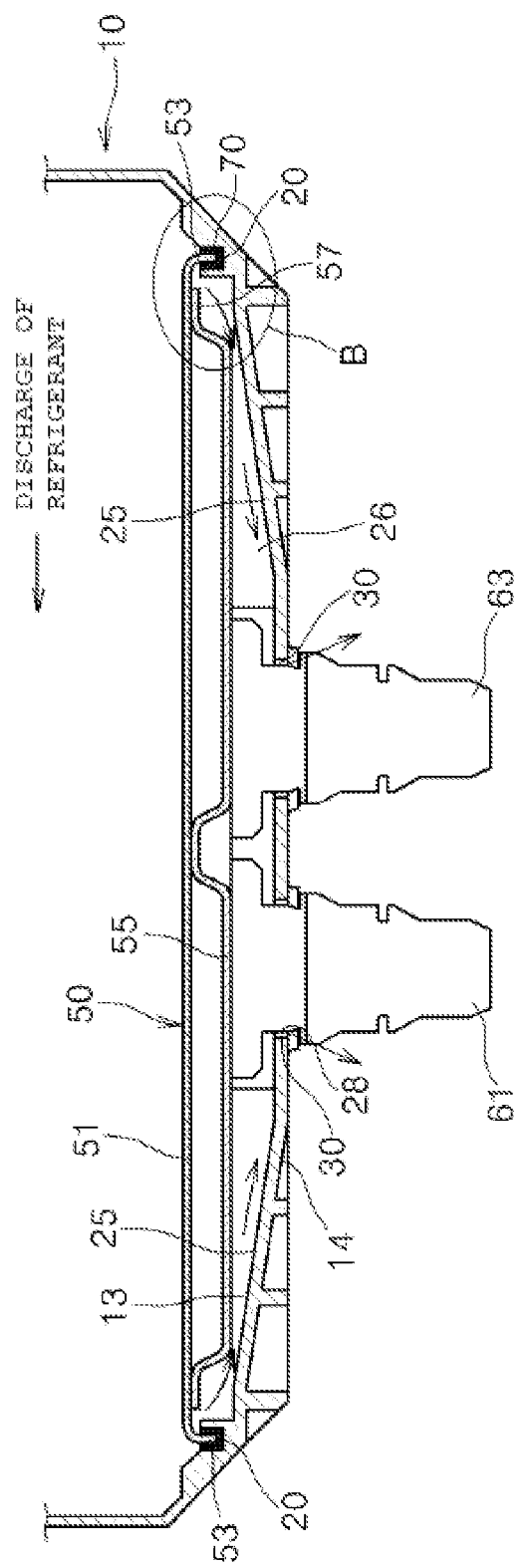

[FIG. 7]
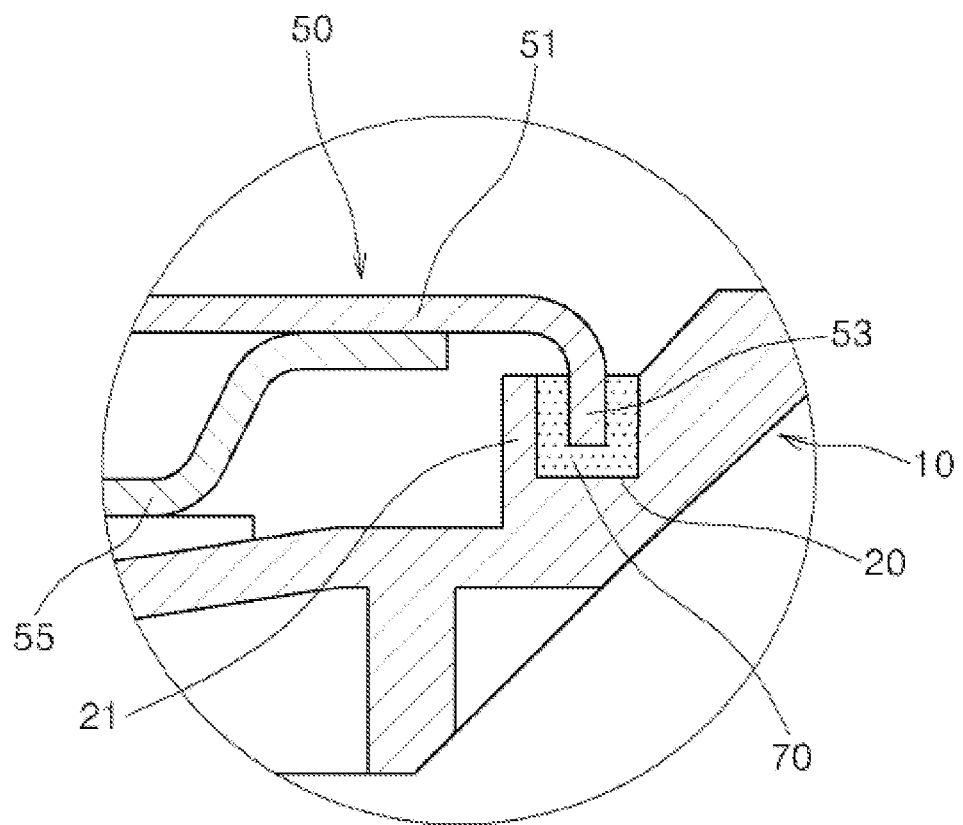

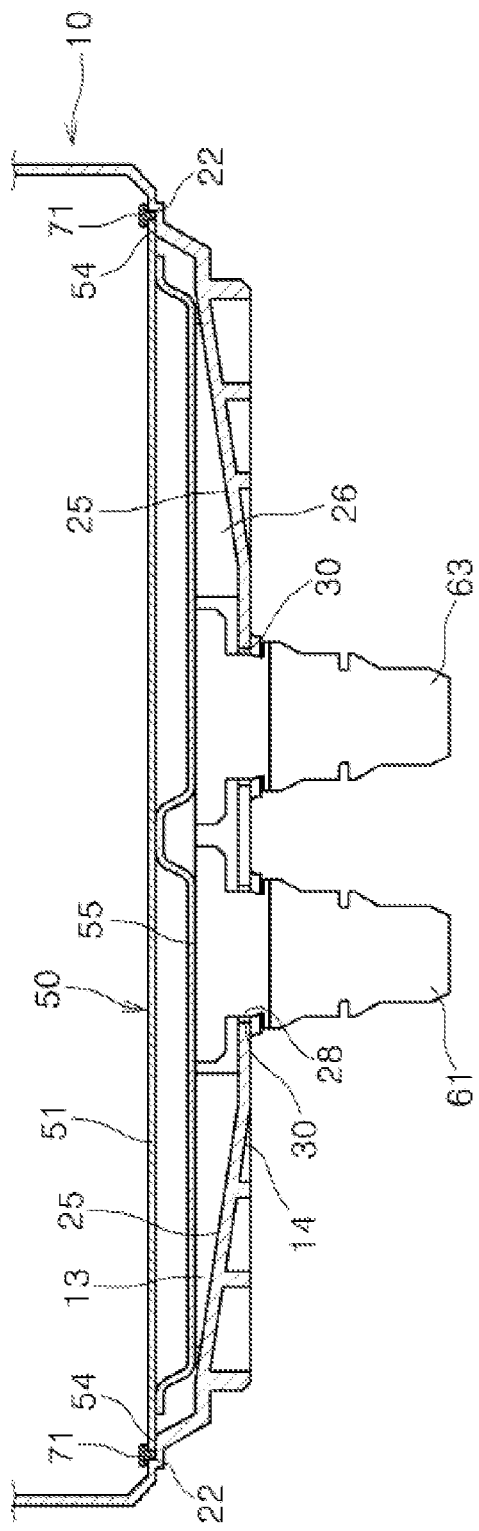

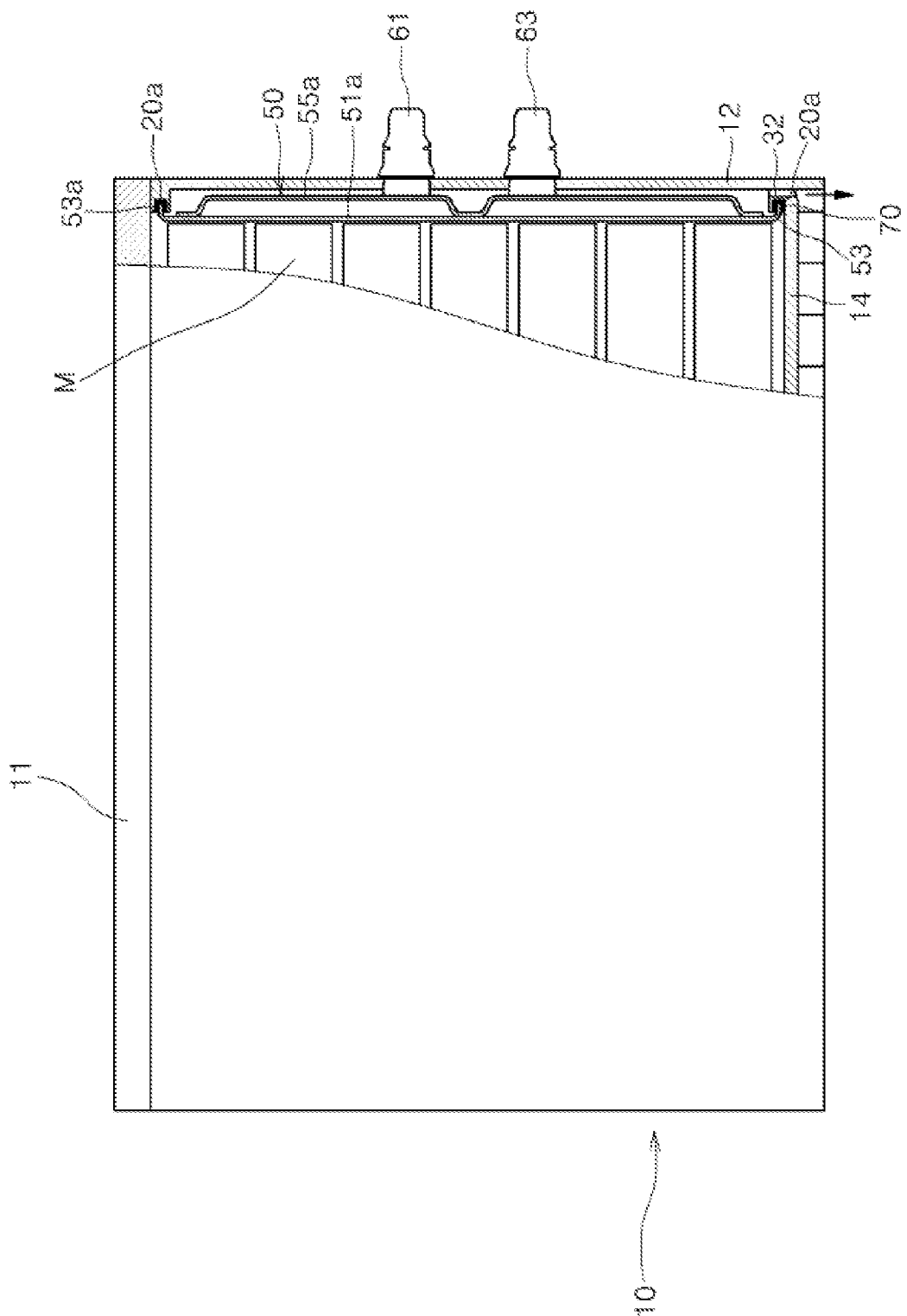

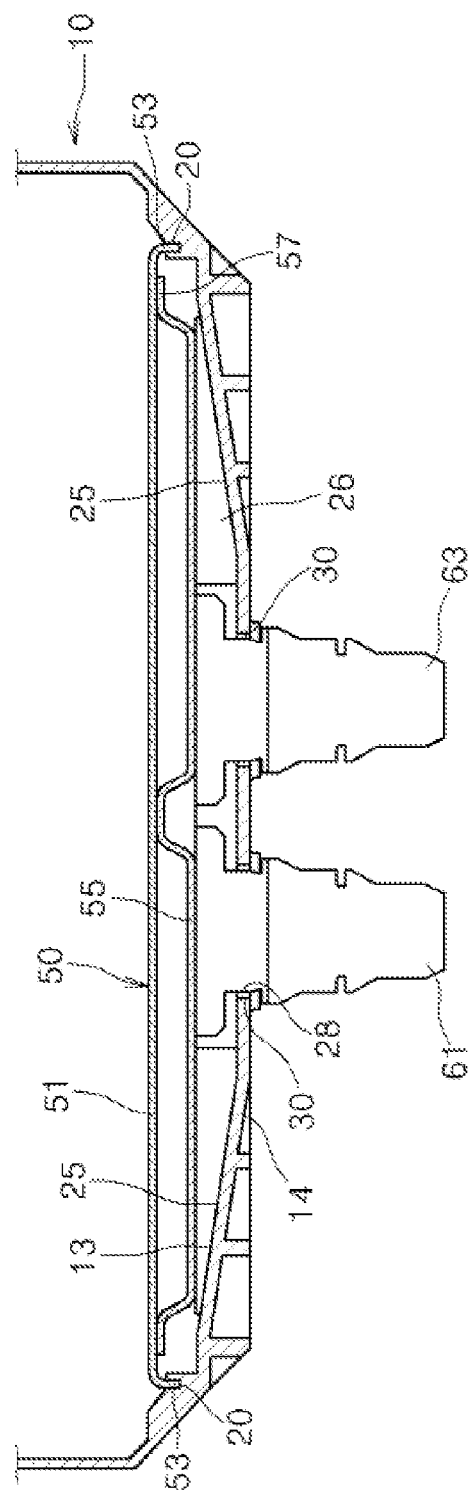
[FIG. 10]

BATTERY PACK HAVING FUNCTION OF PREVENTING INFLOW OF LEAKING COOLANT

This application is a By-Pass Continuation of International Application No. PCT/KR2018/008273 filed on Jul. 23, 2018, which claims priority to Korean Patent Application No. 2017-0134315 filed on Oct. 17, 2017 with the Korean Intellectual Property Office, the disclosures of which are herein incorporated by reference in their entirety.

TECHNICAL FIELD

The present invention relates to a battery pack used for an electric vehicle or the like, and more particularly to a battery pack including a cooling system for cooling a battery.

BACKGROUND ART

In general, a battery pack is mounted in any of various kinds of devices that require electricity, such as an electric vehicle (EV), a hybrid electric vehicle (HEV), and an electric bicycle, in order to supply electricity to the device.

Several battery modules are mounted in the battery pack, and various kinds of control and protection systems, such as a battery management system (BMS) and a cooling system, are further provided in the battery pack.

A battery module includes a plurality of battery cells, each of which is a basic unit of a battery. A secondary battery, which can be charged and discharged, is generally used as each of the battery cells.

The battery pack converts chemical energy into electrical energy mainly through a chemical reaction. At this time, heat is generated from the battery pack. The heat deteriorates the battery cells, whereby the performance, the lifespan, and the safety of the battery cells are reduced. In order to prevent overheating of the battery cells and to maintain the temperature of the battery cells at an appropriate level, a cooling system is provided.

Conventional battery packs each having a cooling system will be described.

Korean Patent Application Publication No. 10-2016-0109679 (hereinafter, referred to as 'Conventional Art 1') discloses a battery pack configured to have a structure in which a battery module and a cooling plate for cooling the battery module are provided in a housing.

In the case in which the cooling plate is mounted in the housing, as disclosed in Conventional Art 1, however, it is not easy to determine whether a coolant is leaking from the cooling plate from outside the battery pack. Also, in the case in which the leaking coolant accumulates in the battery pack, the coolant comes into contact with electric circuits in the battery pack, such as battery cells and a printed circuit board (PCB), whereby the electrical performance and safety of the battery cells may seriously deteriorate.

Japanese Patent Application Publication No. 2014-093245 (hereinafter, referred to as 'Conventional Art 2') discloses a battery unit configured to have a structure in which a water jacket (temperature adjuster) is provided outside a case, such that when a coolant leaks from the water jacket, the coolant is prevented from flowing into a battery.

In the case in which a cooling plate (the water jacket) is provided outside a battery housing (the case), as disclosed in Conventional Art 2, however, cooling efficiency is reduced, and the cooling plate may be easily broken or damaged. In order to solve this problem, it is necessary to improve the durability of the cooling plate or to provide an additional protection device. In this case, however, the overall structure of the battery unit is complicated, and battery manufacturing costs are increased.

DISCLOSURE

Technical Problem

The present invention has been contrived to solve the aforementioned problems. It is an object of the present invention to provide a battery pack having a function of preventing an inflow of a leaking coolant, which is capable of preventing a coolant from flowing toward a battery module and discharging the coolant to the outside when the coolant leaks from a heat exchanger of a cooling system, thereby improving the stability and reliability of the battery.

Technical Solution

In accordance with an aspect of the present invention, the above and other objects can be accomplished by the provision of a battery pack having a function of preventing an inflow of a leaking coolant. The battery pack includes a housing, at least one battery cell or battery module mounted in a first space in the housing, a heat exchanger provided in the housing for cooling the battery cell or the battery module, and a seal provided between the heat exchanger and the inner surface of the housing for preventing a coolant leaking from the heat exchanger from flowing into the first space.

The housing may be provided with channel having a recessed structure, in which a gasket is mounted.

The housing may be provided with a stepped surface, wherein a gasket is mounted to the stepped surface.

The housing may be provided with a discharge opening, wherein the leaking coolant is discharged through the discharge opening.

The housing may be provided with a discharge channel, wherein the discharge channel is connected to the discharge opening.

The seal may divide the interior of the housing into a first space, in which the battery cell or the battery module is located together with the heat exchanger, and a second space, and the discharge opening may be located in the second space.

The heat exchanger may be provided with a coolant introduction port, through which the coolant is introduced, and a coolant discharge port, through which the coolant is discharged, the housing may be provided with port holes, the coolant introduction port and the coolant discharge port extending through the port holes, and the discharge opening may be formed in each of the port holes.

The port holes may be formed so as to have an uneven structure such that the discharge openings are defined between the discharge port and one of the port holes and between the introduction port and the other of the port holes.

The heat exchanger may be configured by plural plates joined to each other to define a space between the plural plates, through which the coolant flows, and the seal may isolate a joint between one of the plural plates and the inner surface of the housing.

The heat exchanger may include a first plate located adjacent to the battery cell or the battery module and a second plate located adjacent to the bottom surface or the wall surface of the housing, edges of the first plate and the second plate being joined to each other to define a space, through which the coolant flows, between the first plate and the second plate, and a gasket may be formed between the first plate and the inner surface of the housing.

The first plate may be provided at the edge thereof with a skirt, which is bent from the edge of the first plate, and the housing may be provided with the seal, to which the skirt is coupled.

A gasket may be located between the skirt and a channel in the housing.

The heat exchanger may be mounted on the bottom surface of the housing, and the bottom surface of the housing may be provided with a discharge opening, through which the leaking coolant is discharged.

The bottom surface of the housing may be provided with an inclined surface, which extends to the discharge opening.

The housing may be provided with a protruding support rib for supporting the heat exchanger on the inclined surface.

The support rib may extend toward the discharge opening.

Alternatively, the heat exchanger may be mounted on the wall surface of the housing so as to be disposed vertically, and the housing may be provided in the bottom surface thereof with a discharge opening, through which the leaking coolant is discharged.

The seal may be mounted between the edge of the heat exchanger and the inner surface of the housing.

The gasket may include a bonding material for bonding the edge of the heat exchanger to the inner surface of the housing.

The gasket may be a ring-shaped packing member, the packing member being mounted between the housing and the heat exchanger.

In accordance with another aspect of the present invention, there is provided a battery pack having a function of preventing an inflow of a leaking coolant, the battery pack including a housing and a heat exchanger mounted on the inner surface of the housing for cooling a battery cell or a battery module, wherein the heat exchanger includes an upper plate and a lower plate coupled to the upper plate a skirt at an edge of the upper plate, the skirt bent toward the bottom of the housing, and a seal formed between the skirt and the inner surface of the housing.

The seal may be configured to have a channel configured to have a recessed structure, into which the skirt is inserted.

The main technical solutions of the present invention describe above will be more concretely and definitely described in 'best mode' below or in the illustration of the accompanying drawings. In addition to the main technical solutions, various other technical solutions according to the present invention will be further presented and described.

Effects of the Invention

The battery pack having a function of preventing an inflow of a leaking coolant according to the present invention is capable of preventing a coolant from flowing toward a battery module and discharging the coolant to the outside when the coolant leaks from a heat exchanger. Consequently, it is possible to improve the stability and reliability of the battery and to easily determine a coolant leak.

That is, the battery pack according to the present invention is configured such that the interior of the housing is divided into a first space in which the battery module is located and a second space in which a joint or a component connection of the heat exchanger is located, whereby it is possible to prevent a coolant from flowing toward the battery module and to discharge the coolant to the outside even though the coolant leaks from the joint or the component connection of the heat exchanger. Even in the case in which a coolant leaks, therefore, it is possible to maintain the performance of the battery and to guarantee the stability of the battery. In addition, it is possible to immediately determine from outside the housing whether a coolant leaks, whereby it is possible to rapidly cope with the leakage of the coolant.

BRIEF DESCRIPTION OF DRAWINGS

FIG. 1 is an exploded perspective view showing an entire battery pack according to a first embodiment of the present invention.

FIG. 2 is an exploded perspective view showing a principal part of the battery pack according to the first embodiment of the present invention.

FIG. 3 is a bottom perspective view showing the battery pack according to the first embodiment of the present invention.

FIG. 4 is a plan view showing a bottom surface of a housing of the battery pack according to the first embodiment of the present invention.

FIG. 5 is a plan view showing a heat exchanger coupled to the housing of the battery pack according to the first embodiment of the present invention.

FIG. 6 is a sectional view taken along line 6-6 of FIG. 5.

FIG. 7 is a detailed view showing part "B" of FIG. 6.

FIG. 8 is a sectional view showing a lower structure of a battery pack according to a second embodiment of the present invention.

FIG. 9 is a schematic configuration view showing a battery pack according to a third embodiment of the present invention.

FIG. 10 is a sectional view showing a lower structure of a battery pack according to a fourth embodiment of the present invention.

BEST MODE

Figure 11:
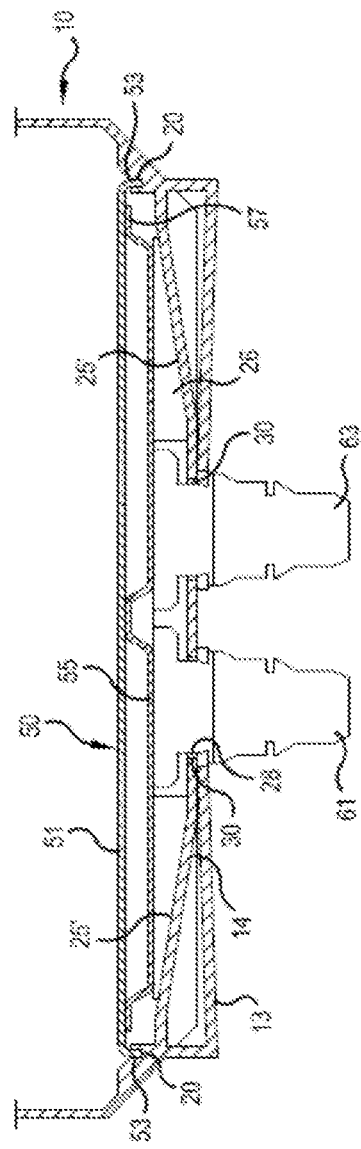
FIG. 11 is a sectional view showing a lower structure of a battery pack of an embodiment of the present invention having a discharge channel.

Reference will now be made in detail to the preferred embodiments of the present invention, examples of which are illustrated in the accompanying drawings.

Hereinafter, four embodiments of the present invention will be described, and modifications of each embodiment will be further described.

First, a first embodiment of the present invention will be described with reference to FIGS. 1 to 7.

FIGS. 1 to 7 are views showing a battery pack according to a first embodiment of the present invention. FIG. 1 is an exploded perspective view, FIG. 2 is an exploded perspective view showing a principal part, FIG. 3 is a bottom perspective view, FIG. 4 is a plan view showing a bottom surface of a housing, FIG. 5 is a plan view showing a state in which a heat exchanger is coupled to the housing, FIG. 6 is a sectional view taken along line 6-6 of FIG. 5, and FIG. 7 is a detailed view showing part "B" of FIG. 6.

Referring to FIGS. 1 and 2, a heat exchanger 50 is mounted on the bottom of a housing 10 constituting the battery pack.

The housing 10 may be configured to have a hexahedral structure opened at the upper part thereof, and a cover 11 may be coupled to the upper part of the housing 10. The shape and structure of the housing 10 are not limited to the shape and structure illustrated in the drawings. The housing may be variously modified depending on the implementation conditions, as long as the housing is configured to have a structure in which battery cells or battery modules may be mounted therein.

A plurality of battery modules M is mounted in the housing 10. For example, as shown in FIG. 1, the battery modules M may be continuously arranged vertically.

The heat exchanger 50 for controlling the temperature of the battery modules M is mounted on a bottom surface 13 of the housing 10. The heat exchanger 50 is a main constituent element of a cooling system, and is configured to allow a coolant to pass therethrough and to adjust the temperature of the battery modules M.

As shown in FIG. 2, the heat exchanger 50 may be configured to have a cooling plate type structure made by coupling an upper plate 51 and a lower plate 55 so that the coolant passes through the interior of the cooling plate type structure.

The upper plate 51 is configured to be in contact with the battery modules M which are disposed on the upper plate 51 through a heat transfer member, and the lower plate 55 is configured such that an introduction port 61, through which the coolant is introduced, and a discharge port 63, through which the coolant is discharged, are connected to the lower plate 55.

As shown in the drawings, each of the upper plate 51 and the lower plate 55 may be formed so as to have a flat quadrangular structure having a predetermined thickness. The edges of the upper plate 51 and the lower plate 55 are joined to each other such that the coolant flows in the interior defined between the upper plate 51 and the lower plate 55.

The lower plate 55 may be formed so as to have a pan-shaped structure having a predetermined depth, and may have a flange 57 formed horizontally at the edge of the lower plate 55.

The upper plate 51 may be formed so as to have a flat structure, and the edge of the upper plate 51 may be formed so as to extend further outwards than the flange 57 of the lower plate 55. In particular, a skirt 53 may be formed at the edge of the upper plate 51 so as to be bent downwards.

The upper plate 51 and the lower plate 55 are joined to each other. Specifically, the flange 57 of the lower plate 55 and the bottom surface of the upper plate, which contacts the flange 57, are joined to each other when the upper plate 51 is placed on the lower plate 55, whereby the heat exchanger 50, through which the coolant flows, is completed.

The skirt 53, which is formed at the edge of the upper plate 51, is configured to be inserted into or coupled to a channel 20 of the housing 10, a description of which will follow.

Next, the structure of the bottom of the housing 10, on which the heat exchanger 50 is disposed, will be described.

Referring to FIGS. 4 to 6, the channel 20, into which the skirt 53 of the heat exchanger 50 is inserted, is formed on the bottom surface 13 of the housing 10.

In the case in which the edge of the heat exchanger 50 is quadrangular, as in this embodiment, the channel 20 may be formed so as to have a quadrangular shape.

The channel 20 may be configured to have a recessed structure, into which the skirt 53 of the heat exchanger 50 is inserted. Alternatively, an inner wall 21 of the channel 20 may be removed.

In order to prevent leaking coolant from flowing toward the battery modules M when the heat exchanger 50 is coupled to the housing 10, as described above, a gasket 70 for interrupting the inflow of coolant is mounted between the skirt 53 and the channel 20.

The gasket 70 is basically mounted so as to isolate the joint between the upper plate 51 and the lower plate 55 from the first space in which the battery modules M are placed. In the case of the heat exchanger 50, the coolant may easily leak from the joint between the upper plate 51 and the lower plate 55, the connection between the lower plate 55 and the introduction port 61, and the connection between the lower plate 55 and the discharge port 63. Consequently, the gasket 70 is mounted above the joint and the connections of the heat exchanger 50 such that the joint and the connections of the heat exchanger 50 are separated from the first space in which the battery modules M are placed to prevent the leaking coolant from flowing toward the battery modules M.

The gasket 70 may include a filling material, a bonding material, or a packing member.

The filling material is made of a soft material, such as silicone. When the skirt 53 is inserted into the channel 20 when the channel 20 is filled with the filling material, the filling material performs a sealing function, whereby it is possible to form a seal to prevent the leaking coolant from flowing upwards.

The bonding material is made of an adhesive material. When the channel 20 is filled with the bonding material, in a manner similar to the filling material, or when the bonding material is applied to the skirt 53, the skirt 53 is coupled to the channel 20 such that the skirt 53 is fixed to the channel 20, to form a seal to prevent the leaking coolant from flowing upwards.

The packing member may be configured to have a ring-shaped structure made of a rubber material. When the skirt 53 is inserted into the channel 20 when the packing member is mounted at the end of the skirt 53 or when the packing member is inserted and mounted in the channel 20, the packing member performs a sealing function, to form a seal to prevent the leaking coolant from flowing upwards.

In addition to the materials or the member described above, various well-known sealing members may be used as the gasket 70 depending on the implementation conditions, as long as the gasket 70 is a material or a structure provided between the skirt 53 and the channel 20 to stop the inflow of coolant.

As shown in FIGS. 3 and 4, the lower surface 14 of the housing 10 is formed such that the middle portion thereof protrudes downwards. Port holes 28 are formed in the lowest portion of the lower surface 14 such that the introduction port 61 and the discharge port 63, which are connected to the heat exchanger 50, are inserted into the port holes 28.

Referring to FIG. 6, the bottom surface 13 of the housing 10 may be formed so as to have an inclined surface 25 that is gradually inclined downwards from the channel 20 toward the port holes 28 such that the leaking coolant is discharged through the port holes 28.

In this case, support ribs 26 may be formed on the inclined surface 25 so as to protrude upwards in order to support the lower surface of the heat exchanger 50. As shown in FIG. 4, the support ribs 26 may be radially arranged about the port holes 28 in order to promote the smooth discharge of the leaking coolant.

The bottom surface 13 of the housing 10 is formed to be inclined, as described above, so that when the coolant leaks from the heat exchanger 50, the coolant flows along the inclined surface and is smoothly discharged out of the housing 10 through the port holes 28.

In this embodiment, the structure in which the leaking coolant flows downwards along the inclined surface 25 is illustrated. Alternatively, a discharge channel 25' for discharging the leaking coolant may be formed in the bottom surface 13 of the housing 10, instead of forming the inclined surface, as illustrated in FIG. 11. In this case, the discharge channel may be connected to discharge openings 30.

Gaps or openings may be formed between the port holes 28 and the introduction port 61 and the discharge port 63 such that the leaking coolant is smoothly discharged through the port holes 28 when the introduction port 61 and the discharge port 63 are inserted into and located in the port holes 28. To this end, as shown in FIG. 4, the inner surface of each of the port holes 28 may be formed so as to have an uneven structure 29. Alternatively, an additional hole may be formed in the bottom surface 13 of the housing 10 to discharge the leaking coolant out of the housing 10 through the additional hole, instead of discharging the leaking coolant out of the housing 10 through the port holes 28.

Meanwhile, in the above description, the heat exchanger 50 having the cooling plate structure was described with reference to the drawings. However, the present invention is not limited thereto. The gasket according to the present invention may be applied to any of various well-known heat exchangers, as long as the applicable heat exchanger is configured to have a pack type or cylindrical structure in which a coolant flows.

In the battery pack according to the first embodiment of the present invention described above, the joint of the heat exchanger 50 is isolated from the space above the joint by the gasket 70 when the skirt 53 of the upper plate 51 is inserted into the channel 20. When the coolant leaks from the joint of the heat exchanger 50, therefore, the coolant is prevented from flowing upwards to the battery modules M. The coolant flows along the inclined surface 25 toward the discharge openings 30 and is then discharged out of the housing 10.

In the battery pack according to the present invention, therefore, the leaking coolant does not flow upwards to the battery modules M but is discharged to the outside, whereby it is possible to prevent damage to electronic circuits in the battery modules and to easily determine whether a coolant leaks by observing the coolant being discharged to the outside.

Next, a second embodiment of the present invention will be described with reference to FIG. 8.

FIG. 8 is a sectional view showing a lower structure of a battery pack according to a second embodiment of the present invention.

In the first embodiment of the present invention, which was described above, the skirt 53 of the heat exchanger 50 is bent downwards so as to be vertically coupled to the channel 20 opened at the upper part thereof. In the second embodiment of the present invention, however, a tip 54 of the edge of the heat exchanger 50 is coupled to an inner surface of the housing 10 in an approximately horizontal direction.

That is, the tip 54 of the edge of the heat exchanger 50 is not bent but extends straight, and a seal 22 is formed in an inner wall of the housing 10 such that the tip 54 of the edge is coupled to the seal 22. In this case, the seal 22 formed in the housing 10 may be configured to have a stepped structure, on which the tip 54 of the edge of the heat exchanger 50 is placed, as illustrated in FIG. 8.

In this embodiment, gasket 71 may be interposed between the tip 54 of the edge of the heat exchanger 50 and the stepped structure of the seal 22, and may include a bonding material or a packing member, which was described above.

Other features of the second embodiment of the present invention may be identical to or similar to those of the first embodiment of the present invention, and therefore a duplicate description and illustration thereof will be omitted. The constructions of the second embodiment of the present invention that are identical to or similar to those of the first embodiment of the present invent are denoted by the same reference numerals in FIG. 8.

Next, a third embodiment of the present invention will be described with reference to FIG. 9.

FIG. 9 is a schematic configuration view showing a battery pack according to a third embodiment of the present invention.

In the first and second embodiments of the present invention, which were described above, the heat exchanger 50 is mounted on the bottom surface of the housing 10. In the third embodiment of the present invention, however, the heat exchanger 50 is mounted on a side surface (or a wall surface) of the housing 10, which will be emphasized in the following description.

The heat exchanger 50 may be mounted on the side surface of the housing 10 so as to be disposed vertically depending on the structure in which the battery modules M are disposed in the housing 10. Even in this case, the coolant may leak from the heat exchanger 50 when the heat exchanger 50 is damaged or broken. Consequently, a structure for preventing an inflow of a coolant is provided to prevent the coolant from flowing into the space in which the battery modules M are placed.

Referring to FIG. 9, the structure for preventing an inflow of a coolant according to this embodiment is provided between the inner surface of the housing 10 and four side surfaces of the heat exchanger 50 or between the inner surface of the housing 10 and three side surfaces of the heat exchanger 50, excluding the upper side surface thereof, since the heat exchanger 50 is located vertically in the housing 10.

That is, in the case in which the heat exchanger 50 includes a first plate 51a located adjacent to the battery modules M and a second plate 55a coupled to the first plate 51a, the edge of the first plate 51a extends further to constitute an extension 53a, and a channel 20a, into which the extension 53a is inserted, is formed in the housing 10. A gasket 70 is mounted between the extension 53a and the channel 20a to prevent the leaking coolant from flowing into the space in which the battery modules M are placed.

A discharge opening 32, through which the leaking coolant is discharged, may be formed in the lower surface 14 of the housing 10.

Next, a fourth embodiment of the present invention will be described with reference to FIG. 10.

FIG. 10 is a sectional view showing a lower structure of a battery pack according to a fourth embodiment of the present invention.

In the first to third embodiments of the present invention, which were described above, the gasket 70 or 71 is mounted between the tip of the edge of the heat exchanger 50 and the channel 20 of the housing 10. In the fourth embodiment of the present invention, however, a structure capable of interrupting the inflow of the leaking coolant without using the gasket is provided.

In the fourth embodiment of the present invention, as shown in FIG. 10, the skirt 53 of the heat exchanger 50 is inserted into the channel 20 of the housing 10, and no gasket is provided.

The channel 20 may be configured to have a recessed structure, into which the skirt 53 is inserted.

The skirt 53 may be tightly inserted into the channel 20 by interference fitting. Alternatively, a fastener or a wedge may be used in the case in which the skirt 53 is inserted and fixed in the channel 20 even though the skirt 53 is not tightly inserted into the channel 20.

An inner wall 21 of the channel 20 may be removed or a hole may be formed in the wall of the channel 20 in order to easily discharge coolant.

The fourth embodiment of the present invention may be identical or similar in construction to the first embodiment of the present invention, which was described above, with the exception that the skirt 53 of the heat exchanger is coupled to the channel 20 of the housing 10 when no gasket is provided. Consequently, the components of the battery pack according to the fourth embodiment of the present invention that are identical to or similar to those of the battery pack according to the first embodiment of the present invention are denoted by the same reference numerals, as shown in FIG. 10, and a duplicate description thereof will be omitted.

In the embodiments of the present invention described above, the battery modules are mounted in the battery pack. Alternatively, the same or a similar structure may also be applied to a cooling system that is used for a single battery module.

The technical ideas described in the above embodiments of the present invention may be implemented individually or in a combined state. In addition, the present invention was described with reference to the accompanying drawings and the embodiments presented in the detailed description of the present invention, which, however, are merely illustrative. Those skilled in the art to which the present invention pertains will appreciate that various applications and modifications are possible based on the above description. Consequently, the scope of technical protection of the present invention is limited only by the claims.

The invention claimed is:

1. A battery pack having a function of preventing an inflow of a leaking coolant, the battery pack comprising:
 a housing, the housing having a bottom wall;
 at least one battery cell or battery module mounted in a first space in the housing;
 a heat exchanger provided in the housing for cooling the battery cell or the battery module, the heat exchanger being spaced above the bottom wall of the housing and having at least one port;
 a seal provided between the heat exchanger and an inner surface of the housing for preventing a coolant leaking from the heat exchanger from flowing into the first space of the housing;
 at least one port hole in the bottom wall of the housing, the at least one port extending through the at least one port hole; and
 at least one discharge opening formed around the at least one port hole,
 wherein the at least one port hole has an edge, and
 wherein the at least one discharge opening is a notch in the edge of the at least one port hole.

2. The battery pack according to claim 1, wherein the housing is provided with a channel having a recessed structure,
 wherein a gasket is mounted in the channel to form the seal.

3. The battery pack according to claim 1, wherein the housing is provided with a stepped surface,
 wherein a gasket is mounted to the stepped surface to form the seal.

4. The battery pack according to claim 1, wherein the housing is provided with a discharge channel,
 wherein the discharge channel is connected to the at least one discharge opening.

5. The battery pack according to claim 1, wherein the heat exchanger comprises:
 a coolant introduction port, through which the coolant is introduced; and
 a coolant discharge port, through which the coolant is discharged,
 wherein the at least one port holes comprises two port holes, the coolant introduction port and the coolant discharge port extending through the port holes, and
 wherein the at least one discharge opening is two discharge openings respectively formed around of the port holes.

6. The battery pack according to claim 1, wherein the heat exchanger comprises plural plates joined to each other to define a space between the plural plates, through which the coolant flows, and
 wherein the seal isolates a joint between one of the plural plates and the inner surface of the housing.

7. The battery pack according to claim 1, wherein the heat exchanger comprises:
 a first plate located adjacent to the battery cell or the battery module; and
 a second plate located adjacent to a bottom surface or a wall surface of the housing,
 wherein edges of the first plate and the second plate are joined to each other to define a space, through which the coolant flows, between the first plate and the second plate, and
 wherein a gasket is mounted between the first plate and the inner surface of the housing.

8. The battery pack according to claim 7, wherein the first plate is provided at an edge thereof with a skirt, which is bent from the edge of the first plate, and
 wherein the housing is provided with a gasket, to which the skirt is coupled.

9. The battery pack according to claim 2, wherein the heat exchanger is provided at an edge thereof with a skirt, and
 wherein the gasket is located between the skirt and the channel in the housing.

10. The battery pack according to claim 1, wherein the bottom wall of the housing has an inclined surface, which extends to the discharge opening.

11. The battery pack according to claim 10, further comprising a protruding support rib for supporting the heat exchanger on the inclined surface.

12. The battery pack according to claim 1, wherein the heat exchanger is mounted on a wall surface of the housing and is disposed vertically.

13. The battery pack according to claim 2, wherein the gasket comprises a bonding material for bonding an edge of the heat exchanger to the inner surface of the housing.

14. The battery pack according to claim 2, wherein the gasket is a ring-shaped packing member, the packing member being mounted between the housing and the heat exchanger.

* * * * *